United States Patent [19]
Szmanda et al.

[11] Patent Number: 5,466,078
[45] Date of Patent: Nov. 14, 1995

[54] INPUT KEYBOARD APPARATUS FOR INFORMATION PROCESSING AND OTHER KEYBOARD DEVICES

[75] Inventors: Jeffrey P. Szmanda, Milwaukee; William J. Szmanda, Menomonee Falls, both of Wis.

[73] Assignee: Health Care Keyboard Company, Menomonee Falls, Wis.

[21] Appl. No.: 292,488

[22] Filed: Aug. 18, 1994

Related U.S. Application Data

[63] Continuation of Ser. No. 39,266, filed as PCT/US91/05657, Aug. 8, 1991, abandoned, which is a continuation-in-part of Ser. No. 376,690, Jul. 7, 1989, Pat. No. 5,067,834.

[51] Int. Cl.$^6$ ............................. B41J 5/10; F16M 13/00
[52] U.S. Cl. ..................... 400/489; 400/82; 400/472; 248/181.1; 248/918
[58] Field of Search ........................ 400/82, 472, 473, 400/488, 489, 492; 430/711, 712; 345/168, 169, 178; 248/181, 187, 224.2, 279, 288.3, 918, 921, 923

[56] References Cited

U.S. PATENT DOCUMENTS

| | | | |
|---|---|---|---|
| 3,990,565 | 11/1976 | Felton et al. | 400/489 |
| 4,365,561 | 12/1982 | Telliee et al. | 248/921 |
| 4,378,553 | 3/1983 | McCall | 341/21.22 |
| 4,402,624 | 9/1983 | Stahl et al. | 400/681 |
| 4,562,988 | 1/1986 | Bumgardner | 248/921 |
| 4,597,681 | 7/1986 | Hodges | 400/488 |
| 4,640,485 | 2/1987 | Day et al. | 248/921 |
| 4,661,005 | 4/1987 | Lahr | 400/489 |
| 4,690,362 | 9/1987 | Helgeland | 248/921 |
| 5,228,791 | 7/1993 | Fort | 400/82 |

*Primary Examiner*—Ren Yan
*Attorney, Agent, or Firm*—Andrus, Sceales, Starke & Sawall

[57] ABSTRACT

A multiple section keyboard includes a universal support for each section permitting unrestricted orientation of each section. A vertical adjustable support includes a telescoping cylinder unit or a three point linkage support. A ball unit connects the vertical support to a slide unit for lateral placement. The ball unit provides rotational and pivotal positioning. A lock unit is coupled to the ball unit and simultaneously looks the ball unit, the linkage unit and the slide unit in place. A separable ball connector may also connect the top inner corners of two keyboards to maintain a V-shaped board configuration. Each section has a separate extendible spacer bar formed with a telescoping portion adapted to be extended outwardly and latched in place between angularly related and spaced keyboard sections. A separate number 6 key unit is provided for coupling to either section for inputting of the digit from that section. The multiple section keyboard desirably provides for some means for rapid location, placement and securement of the sections in particular locations. To this end, the single locking structure and support for each system contributes to the practical implementation of the new keyboard unit.

15 Claims, 10 Drawing Sheets

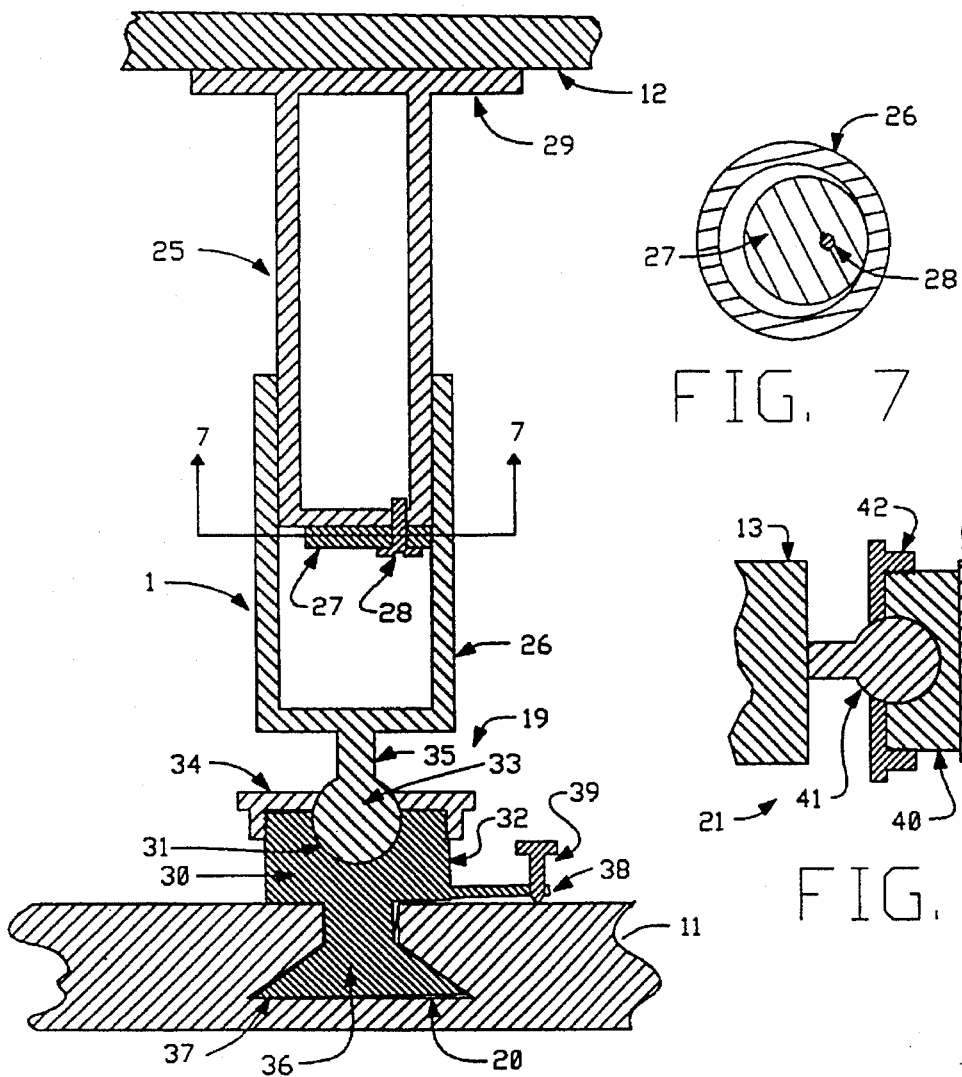

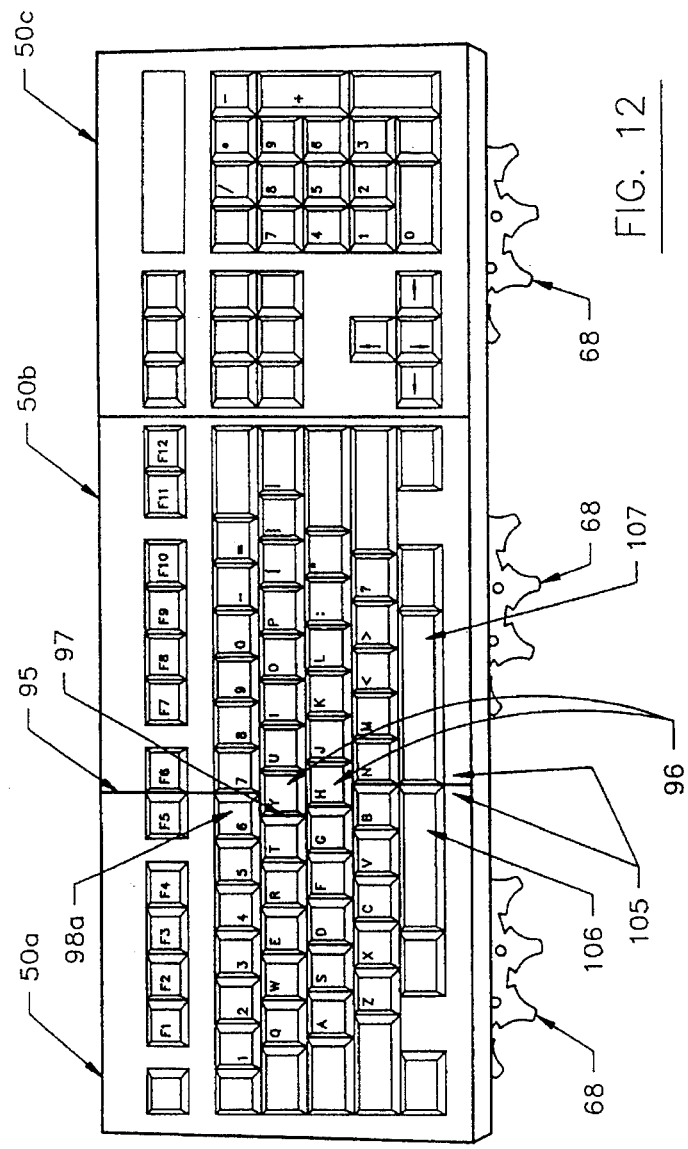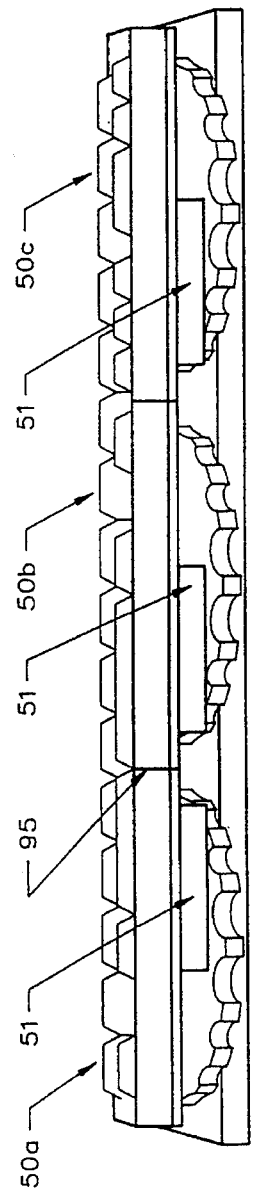

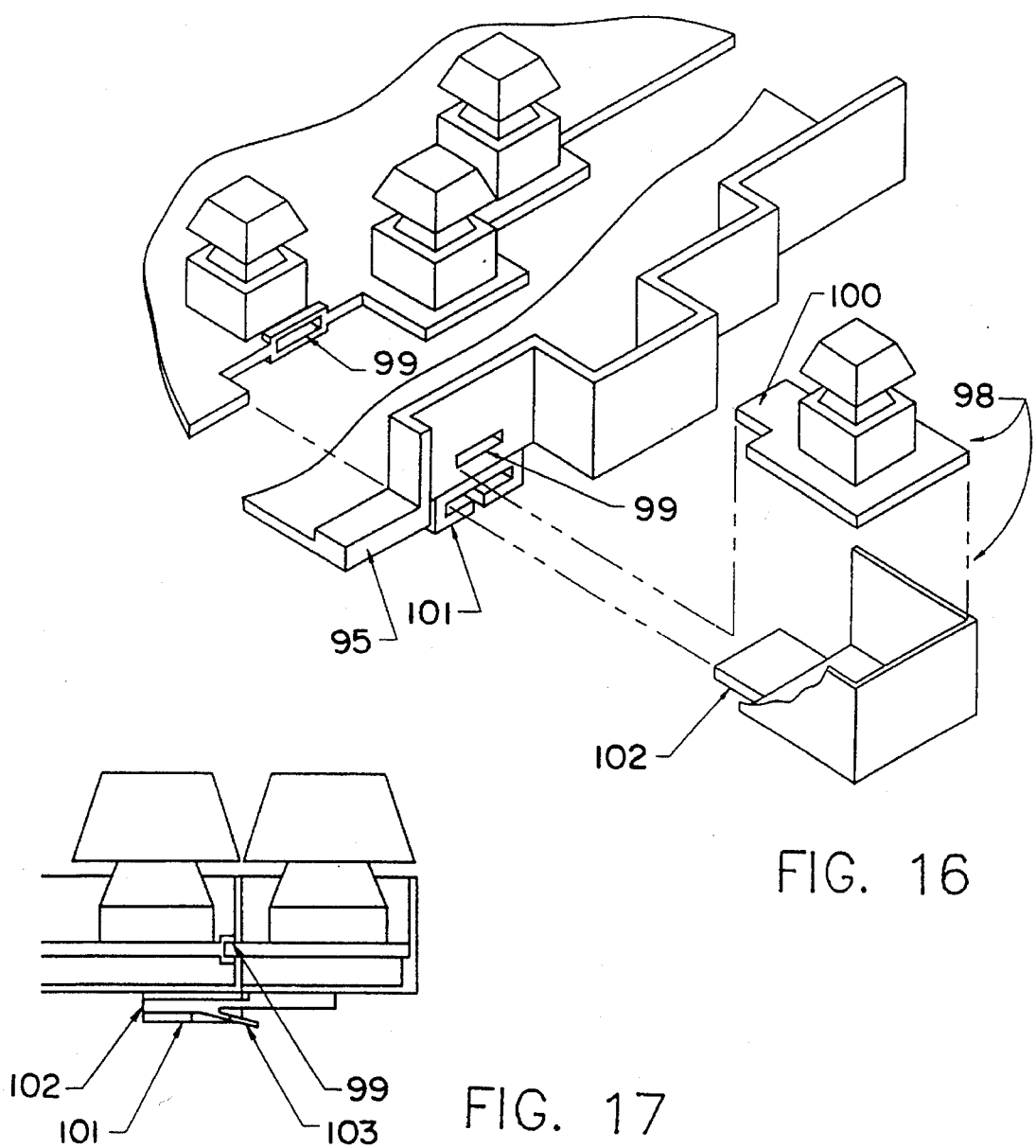
FIG. 16
FIG. 17
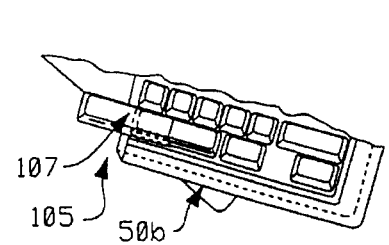
FIG. 18
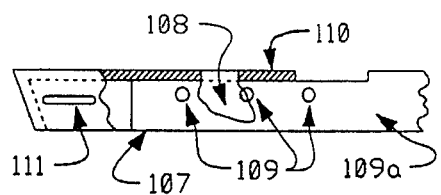
FIG. 19

5,466,078

INPUT KEYBOARD APPARATUS FOR INFORMATION PROCESSING AND OTHER KEYBOARD DEVICES

This application is a continuation of Ser. No. 08/039,266, filed Apr. 8, 1993, which is an application of the national stage of PCT/US91/05657 application filed on Aug. 8, 1991 and a continuation-in-part of application Ser. No. 07/376,690 filed on Jul. 7, 1989 and now U.S. Pat. No. 5,067,834 issued Nov. 26, 1991.

BACKGROUND OF THE PRESENT INVENTION

Input keyboards are used to input information into information processing and translating devices such as computers, typewriters, calculators and the like. The keys for computers and other control devices have been located within a standard cartesian matrix or format of column and rows of individual letters and numbers for many years, with the numbers arranged above the letters. Other devices, such as calculators, may have only numbers and mathematical function keys arranged in rows and columns.

Ergonomic considerations have become of great significance and user considerations are of greater interest. Computers, game and control devices using keyboards are used by persons of all ages and continuously increasing.

Interest in the ergonomic consideration has resulted in certain suggested variations in the standard keyboard.

Significant physical problems result from repetitive motion at a keyboard and may cause serious nerve damage known as carpal tunnel syndrome, which is painful and often requires medical attention. In severe cases, the person may have to cease working. The cost in human suffering, lost time and medical costs associated with the problem is presently severe, and with the greater usage of computer keyboards by the ever increasing population, one can anticipate only creates further and more severe problems.

U.S. Pat. No. 4,402,624 discloses a keyboard having an adjustable support for varying of the inclination or angle of the keyboard as present to the operator. As more fully discussed in the '624 patent, the inclination of the keyboard has been studied and an optimal angled support for an average operator determined with the keyboard generally so constructed. Studies relating to keyboard orientations have investigated the fore and aft inclination as well as possible lateral inclination. A literature compilation on the subject entitled "Keyboard Designs and Operation: A Review Of The Major Issues" by Alden et al and was published in the August 1972 issue of the Journal Of The Human Factors Society with comments on a selected few prior publications.

U.S. Pat. No. 4,378,553 discloses a keyboard formed into two separate parts which can be appropriately spaced and located for use by physically handicapped operators requiring minimal movement during actual inputting of data to the device.

A significant need exists for a feasible keyboard construction which can retain the present key arrangement, and particularly adapted for retrofitting of existing devices.

SUMMARY OF THE PRESENT INVENTION

The present invention is particularly directed to a keyboard apparatus having the keyboard rearranged to facilitate the use of the keyboard without the usual positioning and movement of the hands relative to the arms and in a manner which avoids wrist tensions and complications, and thereby minimizing, if not essentially eliminating, the problem of injury to the wrist or any portion of the arm and hand.

Generally, in accordance with the teaching of this invention, the keyboard is formed with two or more sections having individual universal support units whereby the keyboard sections are adapted to be inclined in space and to present a keyboard assembly tailored to the particular user or operator. The keyboard is may be formed with a dual inclination and an apex at the center, with half the keys arranged to one section and the second half of the keys arranged on the second section of the keyboard. The keys and interrelated mechanism can be constructed in essentially the same manner as presently constructed, although any variation can of course be provided, if desired. A universal mount or support unit allows the positioning of the keyboard sections along three cartesian axis and thus universally spaced for optimal operator comfort and physical safety. The physical difference to the operator however is dramatic in that the hands project straight out from the arm without the necessity of significant angulation or twist, and particular change therein between the hand and the arm at the wrist portion.

In the preferred construction of the support unit, a vertical extendible support is secured to a base permitting lateral spacing of the sections. A universal pivot unit is located within the support structure such that each section can be oriented in space with optimal setting of the keyboard for different operators.

In one construction, a vertical adjustable support includes a telescoping cylinder unit and an internal locking mechanism permits the telescoping and locking of the shaft in any desired vertical orientation or axial projection. In an alternate preferred construction, a three point support is provided. A ball unit connects the vertical unit to the base, with a mounting slide block in a track in the support base for lateral placement. A lock unit coupled to the ball unit simultaneously locks the ball unit, the linkage unit and the slide unit in place.

With a separate keyboard, the separation of the spacer bar prevents the usual operation wherein the thumb may move into the opposite half as in a single keyboard.

In a preferred and unique construction of the present invention, a spacer bar unit is formed with separate extendible bars in each keyboard to form a single continuous spacer bar in the collapsed position with abutting sections and with the spacer bars extended when spaced from each other in the expanded angularly oriented positions. Each individual spacer bar is preferably formed with a telescoping portion adapted to be extended outwardly and latched in place within the space between the angularly related spaced keyboard sections.

In addition in a preferred construction, a separatable number key unit is provided for coupling to the section for the number 6 key. In the collapsed abutting position, the integrated number key is available for operation by either hand in accordance with conventional practice- With the keyboard sections separated, the separatable number key is interconnected to the appropriate keyboard section, providing inputting of the digit through either section in a normal operation.

In a preferred construction, a break or separation line of the keyboard is located to form the two sections having the conventional presentation of a single keyboard in the collapsed position, and with an offset presentation of the keys with the keyboard sections separated. The combination of the appropriate division of the keyboard sections with the releasable number key unit and the spacer bar extension construction provides a highly significant improvement in a multiple sectioned data inputting keyboard, permitting a conventional operation of the data input sections in essentially all sectional locations.

The universal mount may also advantageously be applied to other types of devices including single keyboard devices such as calculators, control devices and the like where a very limited number of keys are provided and are normally one hand operated. In such a device, the keyboard is supported on the single universal support structure.

The present invention thus provides a particular unique multiple section keyboard apparatus, including as a very basic feature the universal mounting of the keyboard for rotation about a pivotal support structure in combination with both vertical and horizontal movement for optimum orientation of the individual key sections or a single key section. Additional unique features particularly applicable to the universally mounted unit but which may be otherwise used in other structures include the concept of the multiple mounting assembly including a single interlocking mechanism which responds to a single mechanical input for simultaneously locking of the various motion mechanisms in location. In addition, in the multiple section keyboards, the removable or insertable releasable duplicate number key as well as the unique extendible spacer bar units are significant in providing for practical implementation of a multiple section keyboard unit.

BRIEF DESCRIPTION OF THE DRAWINGS

The drawings furnished herewith illustrate the best modes presently contemplated for carrying out the invention and are described hereinafter.

In the drawings:

FIG. 6 is an axial sectional view of a universal support unit shown in FIGS. 1–5 and taken generally on line 6—6 of FIG. 2;

FIG. 7 is a sectional view taken generally on line 7—7 of FIG. 6;

FIG. 8 is an axial section through a universal pivot unit connecting the two sections and taken generally on line 8—8 of FIG. 2;

FIG. 12 is an elevational view of a tree section keyboard incorporating the present invention;

FIG. 13 is a front elevational view of the keyboard unit shown in FIG. 12;

FIG. 16 is a fragmentary enlarged view of a portion of the apparatus shown in FIGS. 14 and 15;

FIG. 16 is a fragmentary illustration of a keyboard section shown in FIG. 12 with a special duplicate key mounting;

FIG. 17 is an assembled view of the apparatus shown in the exploded view of FIG. 16;

FIG. 18 is a fragmentary view of a keyboard section shown in FIG. 12 and illustrating an extended spacer bar; and FIG. 19 is a side elevational view with parts broken away and sectioned of the spacer bar unit shown in FIG. 18.

DESCRIPTION OF THE ILLUSTRATED EMBODIMENT

Figure 1:
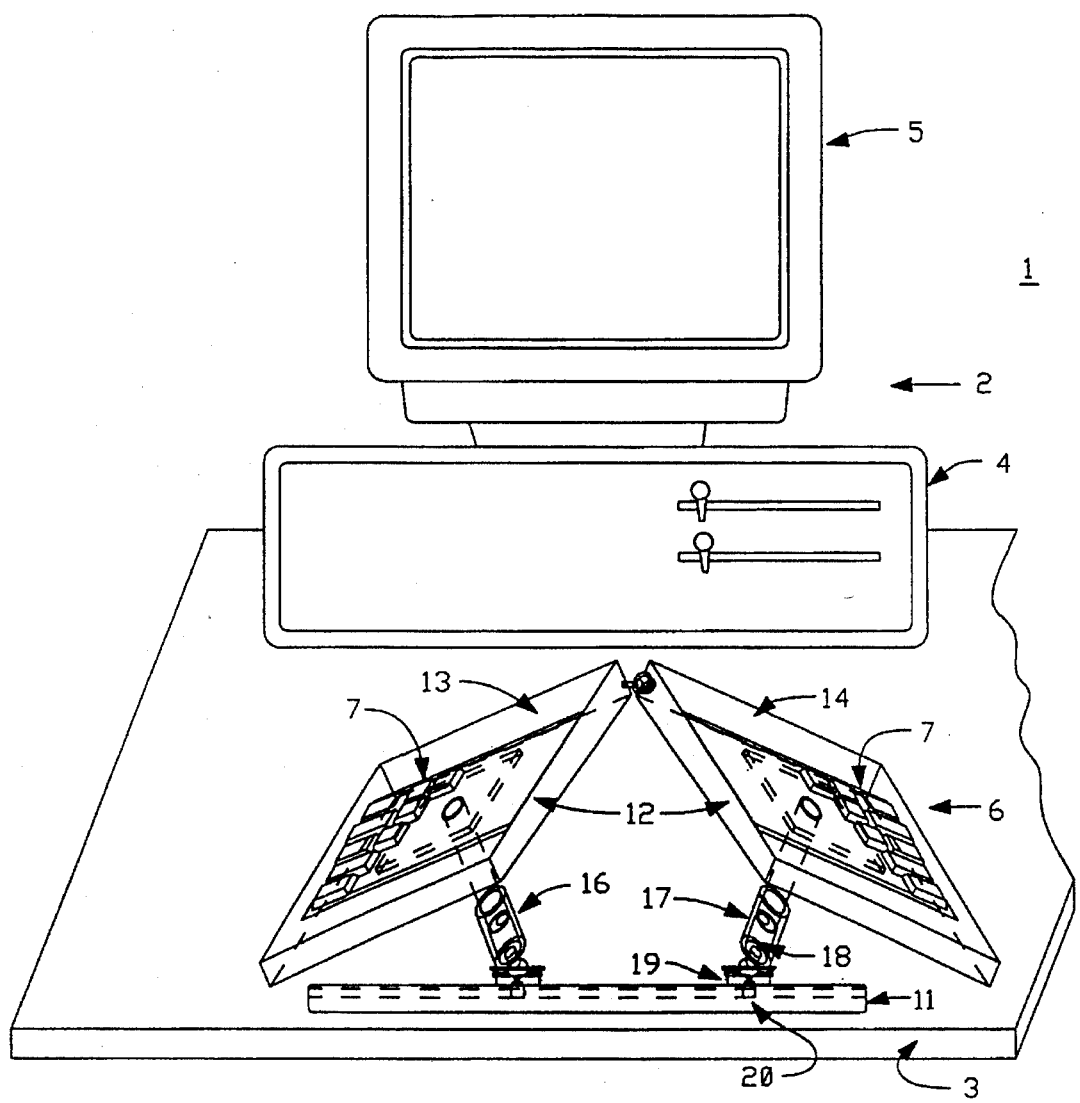
FIG. 1 is a front elevational view of a computer work station including a keyboard unit incorporating the teaching of the present invention.
Figure 3:
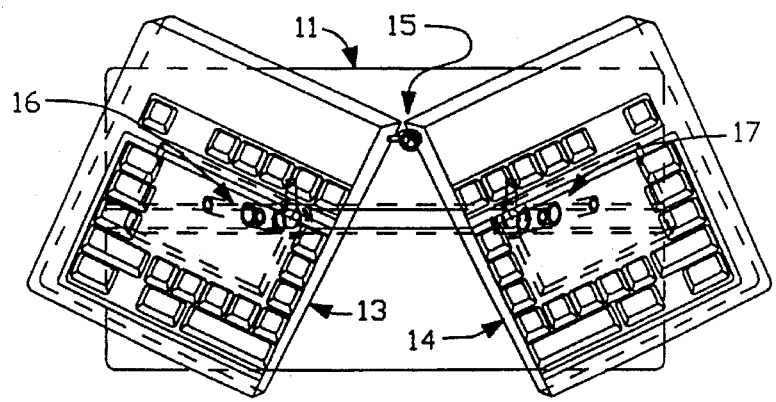
FIG. 3 is a plan view of FIG. 2.
Figure 2:
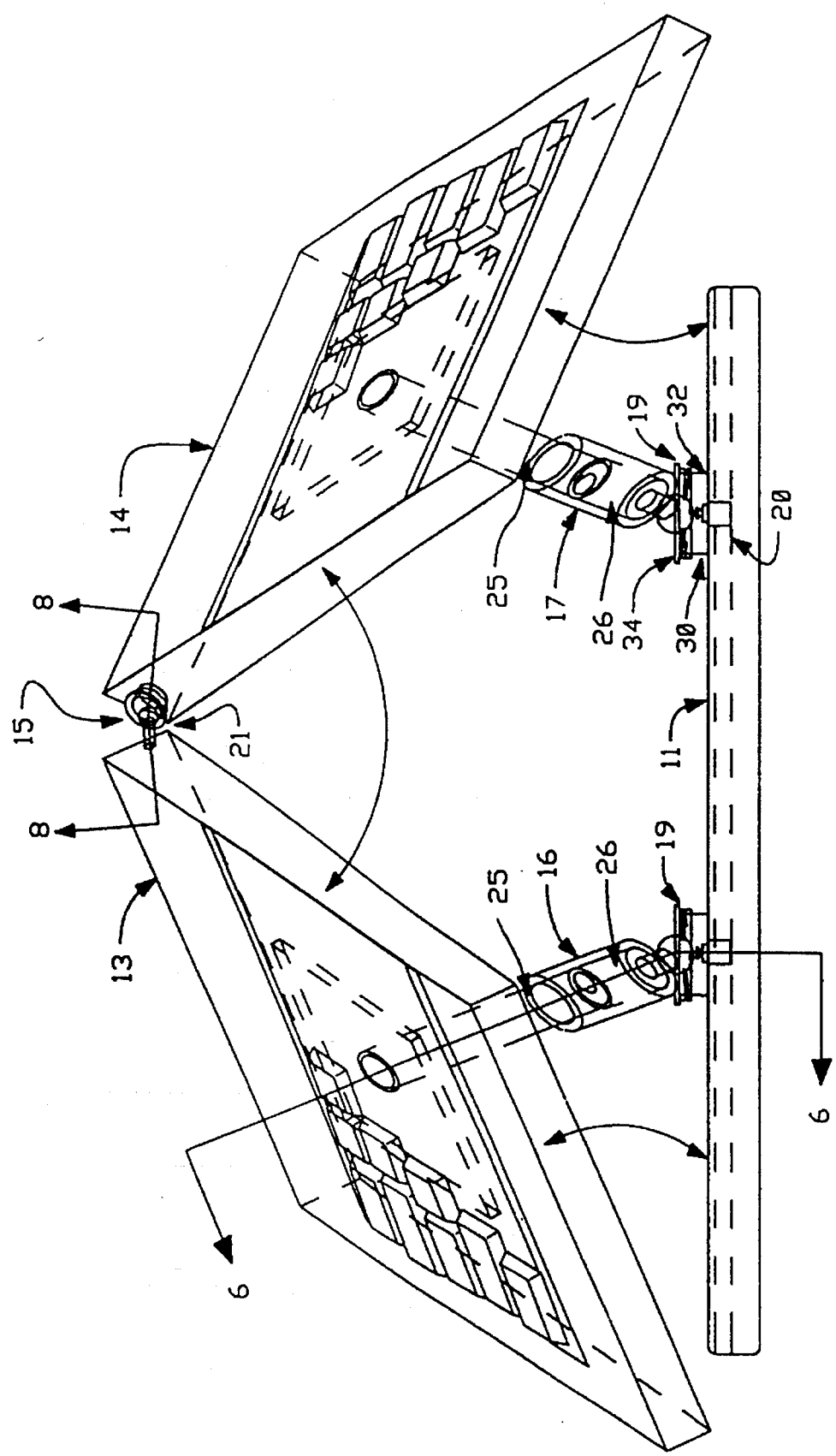
FIG. 2 is an enlarged front elevational view of the keyboard unit.

Referring to the drawings and particularly to FIG. 1, a computer work station 1 is illustrated having a central processing unit 2 mounted on a work table 3 for convenient operation by an operator, not shown. The computer 2 includes a central processing unit 4, shown having an outer housing resting on the table and containing the computer hardware, not shown, for receiving of appropriate software and the like. A display unit or monitor 5 is mounted to the top of the computer 4 for displaying of information as inputted and processed by the computer and selectively outputted by the operator. An inputting keyboard 6 is either mounted to the front of the computer 4 in a convenient location for actuation by the operator or connected by a suitable cable, not shown, to computer unit 4. The keyboard 6 includes an array of the usual keys 7 including alphabetic, numeric and control keys. The keys 7 are arranged in a known manner in a cartesian array and connected to electronic circuits in accordance with existing terminology. The present invention is particularly directed to the construction and configuration of the keyboard and its support for providing a most convenient and effective user designed apparatus. Consequently, the other elements of the computer apparatus are not further described other than as necessary to clearly describe the illustrated embodiment of the invention.

in FIGS. 1 through 3, the keyboard unit 6 includes a supporting bottom wall 11 and an upper wall unit 12. The wall unit 12 includes openings for touch keys 7 in accordance with known constructions. The wall unit 12, in accordance with one embodiment of this invention, is generally an inverted V-shaped configuration defining a left and right keyboard sections 13 and 14 with a central apex 15. Sections 13 and 14 each consist of essentially one half of the keys 7 and are secured to bottom wall 11 by individual universal support units 16 and 17, respectively.

Figure 5:
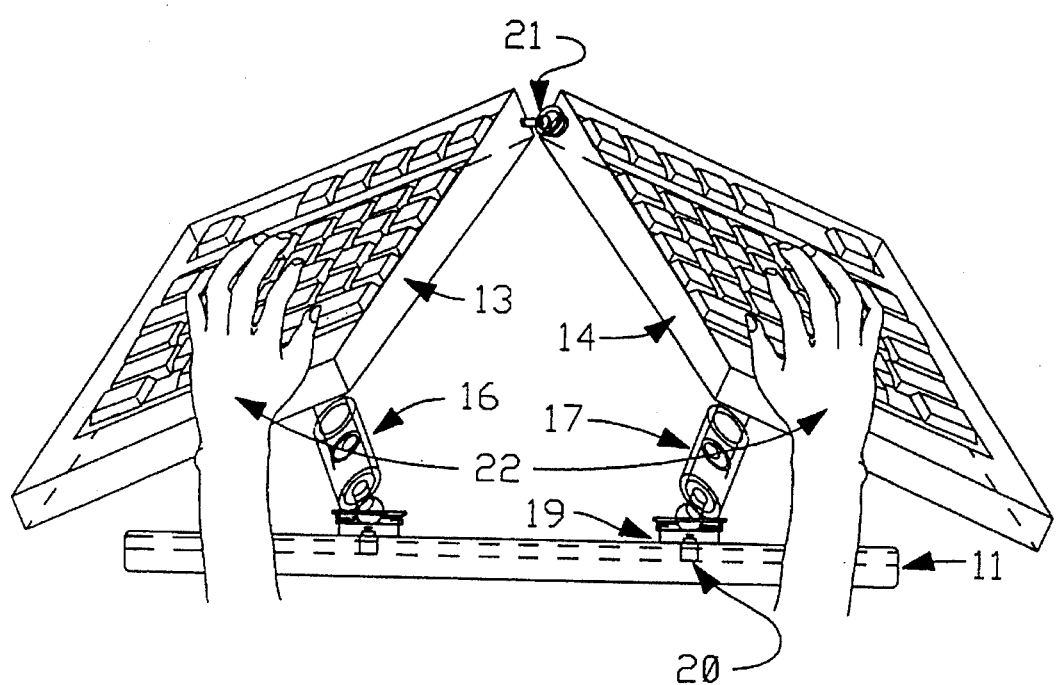
FIG. 5 is a view similar to FIG. 2 illustrating the operator's hands on the keyboard unit.
Figure 4:
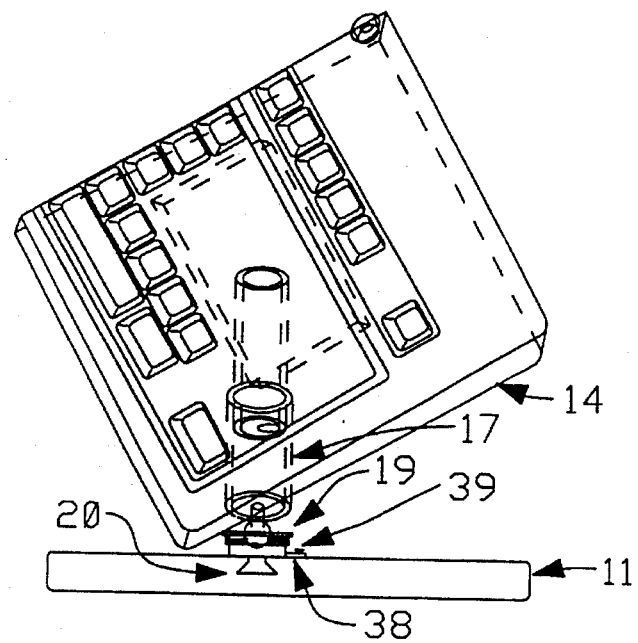
FIG. 4 is a side view of the keyboard shown in FIG. 1.

Support units 16 and 17 are identically constructed. In FIGS. 6 and 7, unit 17 is shown including an extendible post structure 18 and a universal pivot device or unit 19. A sliding attachment unit 20 secures the post structure 18 to the bottom wall 11 for lateral placement relative to the other section. A universal unit 21 joins the top inner edges at the apex 15. The keyboard sections 16 and 17 are therefore movable and spaced to establish optimal positioning for the operator hands 22, as diagrammatically shown in FIG. 5.

The illustrated V-shaped configuration provides a lateral inclination in each of the left and right sections 13 and 14 of the keyboard, with a stepped array of the keys from the outer portion to the top or center apex 15, with the outermost key column at the lower level and with succeeding columns located in the inclination and plane of the tilted keyboard to the apex 15. The wall unit 12 may maintain the conventional front to back inclination generally in accordance with past practice. The front to back inclination thus presents the keys 7 in a stepped array, with the front or forward row of keys 17 at the lowest level and the rearward or back row of keys 18 at the highest level.

The illustrated array of the keys allows the operator's hand 22 to project forward in an essentially straight line from the arm and wrist 23. This is in distinct contrast to the conventional keyboard which requires the hands 19 to be in an offset relationship with respect to the arm in the normal operation of the keyboard, without moving of the total arm structure. The result is a significant reduction in the stress on the wrist structure of the operator and minimizing; if not completely eliminating, the strain and stress on the wrist and interconnecting muscular skeletal portions of the wrist, arm and hands. The operator will not only be physically more comfortable but one can anticipate the mental and emotional improvement to the operator as the result of elimination of the physical damage, and the elimination of any anticipated ailment by the operator as a result of repetitive motion over long periods of work at a computer or other information processing station. Additionally, one can anticipate that learning to activate the keys 7 will be easier and accuracy of the inputting will increase.

Figure 9:
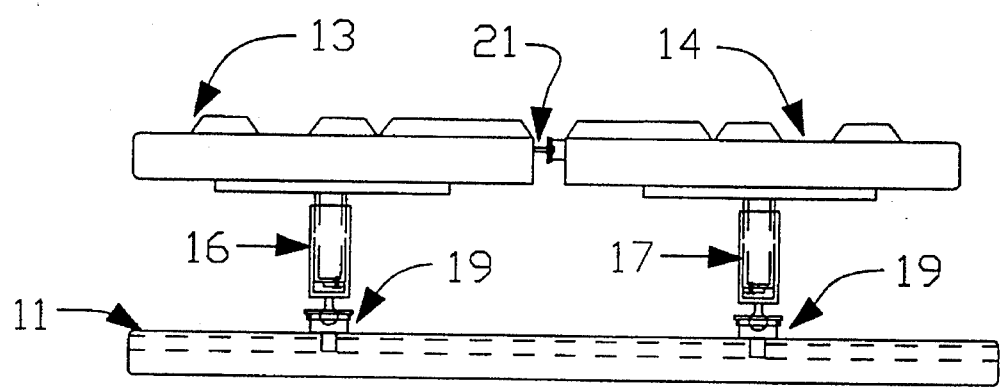
FIG. 9 is a front elevational view of the keyboard in a storage position.

In FIGS. 8–9, post structure 18 is illustrated including telescopic cylinders 25 and 26. A self locking disc member 27 is pivotally affixed by a pivot pin 28 to the inner end of member 25. The pivot pin 28 is located off center of members 25 and 26 such that relative rotation in one direction locks the members 25 and 26 in place, and opposite rotation releases the members for telescopic positioning. The outer end of the post structure 18 has a mount plate 29 secured to member 25. The lower end of the post structure has the universal pivot unit 19 for providing a universal positioning of the station.

Pivot unit 19 includes a cup-shaped pivot member 30 having a semi-cylindrical socket 31 in a mounting base 32. A pivot ball 33 is secured in socket 31 by a cap-nut 34 and has a shaft 35 secured to the bottom end of the telescopic cylinder 26 to permit universal pivoting of the key section.

Unit 20 includes a slide member 36 secured to member 30 and sliding in a groove 37 in bottom wall 11. A lock tab 38 has a bolt 39 threaded into abutting engagement with the bottom wall 11 to lock the section in place.

The pivot unit 21 corresponds to unit 19, with a socket 40 secured to section 14 and a ball 41 is secured to the section 13. A threaded cap 42 on socket 40 releasably locks the ball 41 in place. The pivot locking device can be provided with a coded key, not shown, or the like to restrict adjustment of the keyboard members to authorized personnel. If one operator is the only user of the keyboard, they may of course be provided with an appropriate key so that they can make such adjustments from time-to-time as it appears necessary or desirable.

Figure 10:
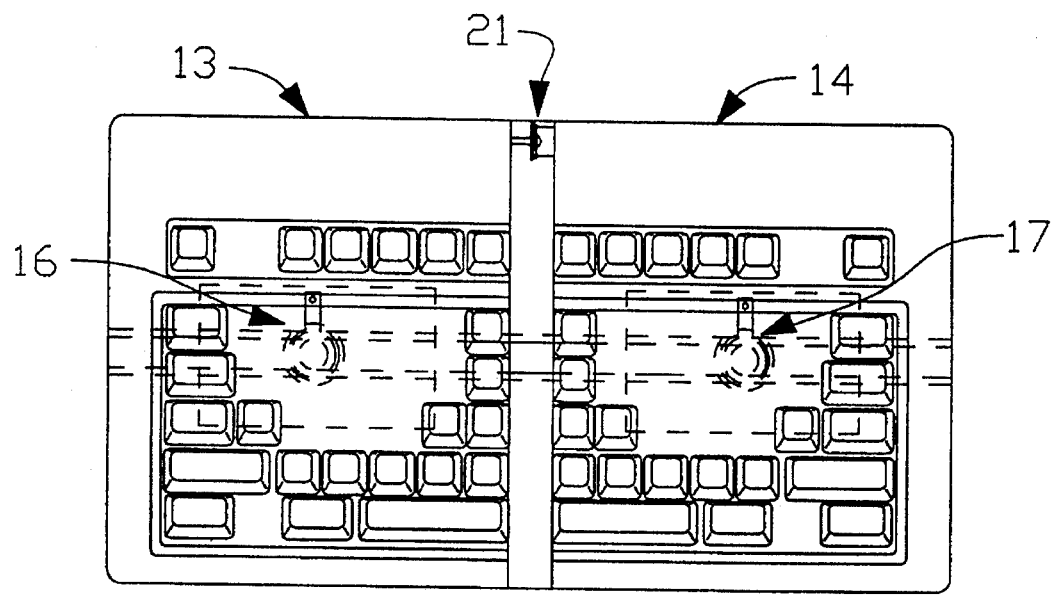
FIG. 10 is a plan view of FIG. 9.
Figure 11:
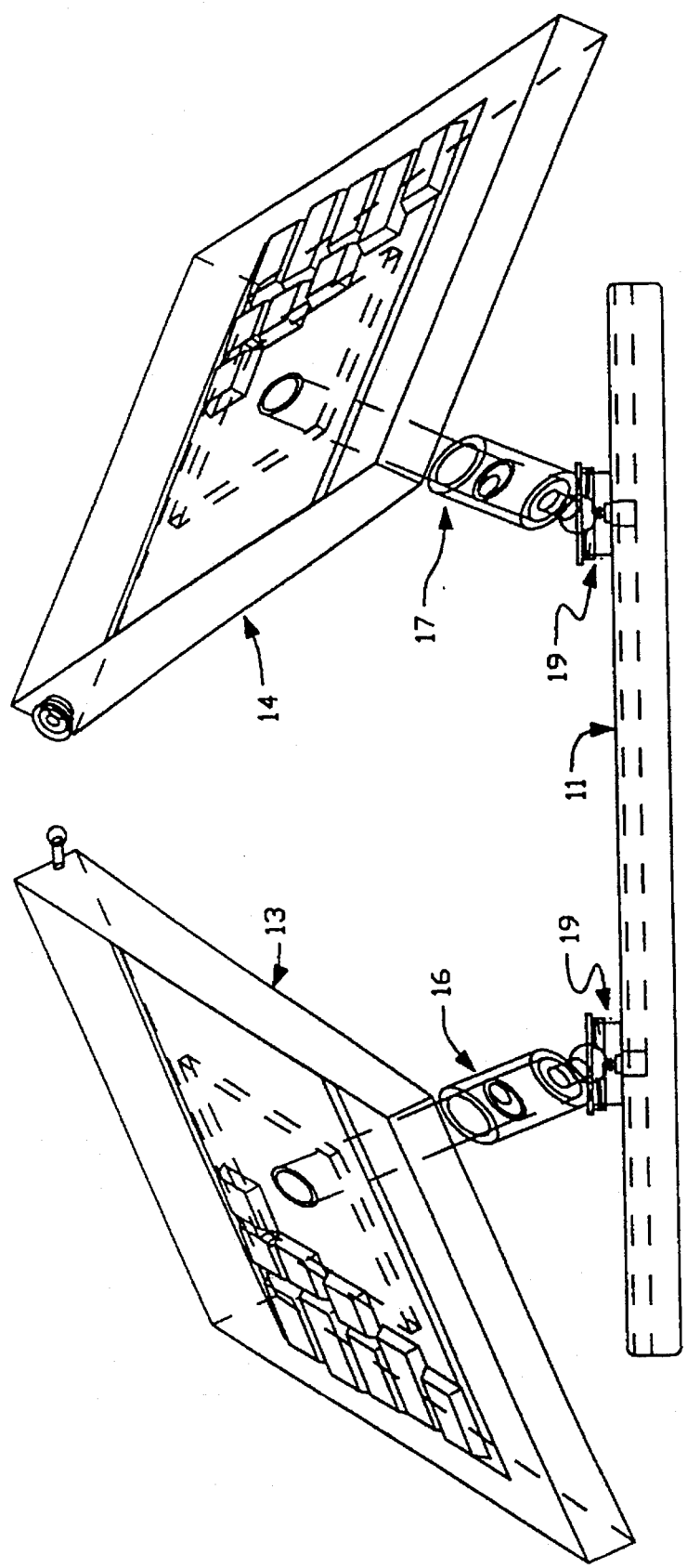
FIG. 11 is a front view illustrating an alternate embodiment of the invention.

Computer cabinets may have a standard section for a standard flat keyboard unit. The illustrated keyboard can be collapsed to a flat rectangular shape, as shown in FIGS. 9 and 10, for storage in the cabinet.

The keyboard unit may of course be constructed without the apex pivot unit 21.

The individual and separated keyboards of FIG. 1 illustrate the applicable aspect of the present invention to single hand operated devices such as adding machines, hand held information keyboard members and the like.

The adjustable positioned keyboard unit may be constructed with a generally closed V-shaped configuration having a central hinge structure shown as a conventional ball-type hinge structure secured to the underside of the top keyboard plate sections 28 and 29.

Computing devices are regularly used over relatively long periods from young grade school or from children in the primary school grades to the very elderly. The invention which permits the precise location of a standard keyboard can advantageously be used for the physical challenged individual because it will permit such individuals to have the keys located in an optimal position for adaptation to his unique physical requirement. The mobility and positioning of the hands and arms will thus have very significantly improved hand orientation not only with the age but with the size and positioning at the work stations.

The present invention is particularly adapted to production of the conventional keyboard with the modified improved hand orientation. In addition, it only requires revision of the key section and could be applied in a reasonably cost effective manner to existing keyboard units by merely providing of the sections and appropriate interconnecting cable and structure to adapt the unit to existing electronic keyboards and the like.

Although illustrated in the multiple adjustable construction, any other suitable adjustable position construction system incorporating the appropriate organization and construction of the keyboard with a left and right universal orientation such as illustrated, or such other arrangement particularly adapted to the improved positioning of the hand with respect to the arm, to prevent the conventional offset therebetween can be provided. For example, the keyboard may not be divided precisely evenly for certain individuals, but may have some slight offset of the sections relative to each other and even without the V-shaped configuration. In addition, further modification to the shape of the keyboard themselves may be desirable to reorient the position of certain keys to minimize any required movement of the hand relative to the arm structure during the typing functions or inputting functions. The universal pivot units within the keyboard section as well as the linear location of the separate sections however provides for maximum optimal location for any given keyboard operator.

Figure 15A:
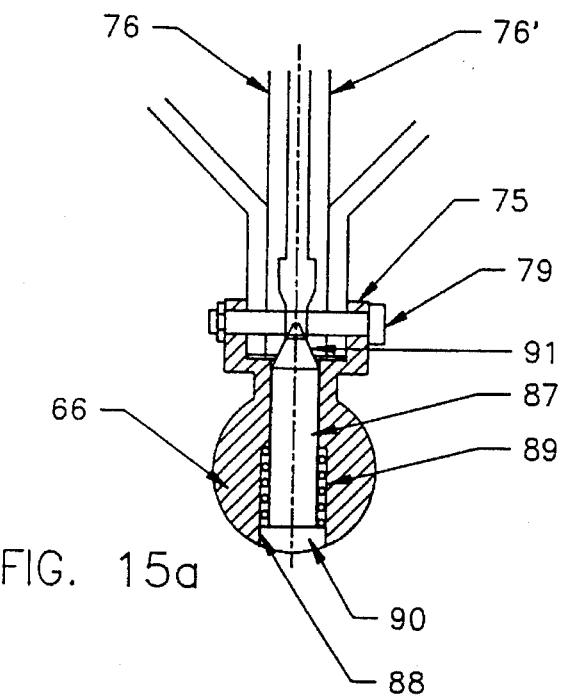
FIG. 15 is an exploded view of the adjustable mount apparatus shown in FIG. 14.
Figure 14:
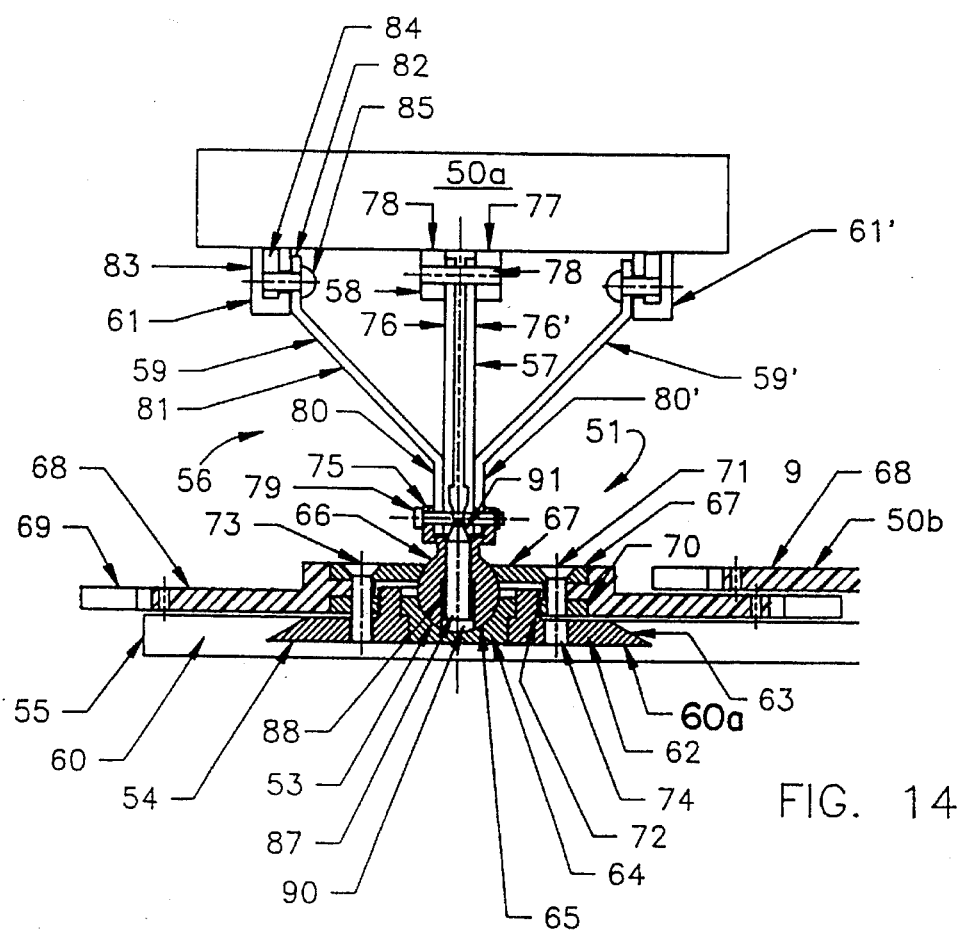
FIG. 14 is an enlarged view of the keyboard section support for the embodiments of FIGS. 12 and 13 with parts broken away and sectioned.
Figure 15:
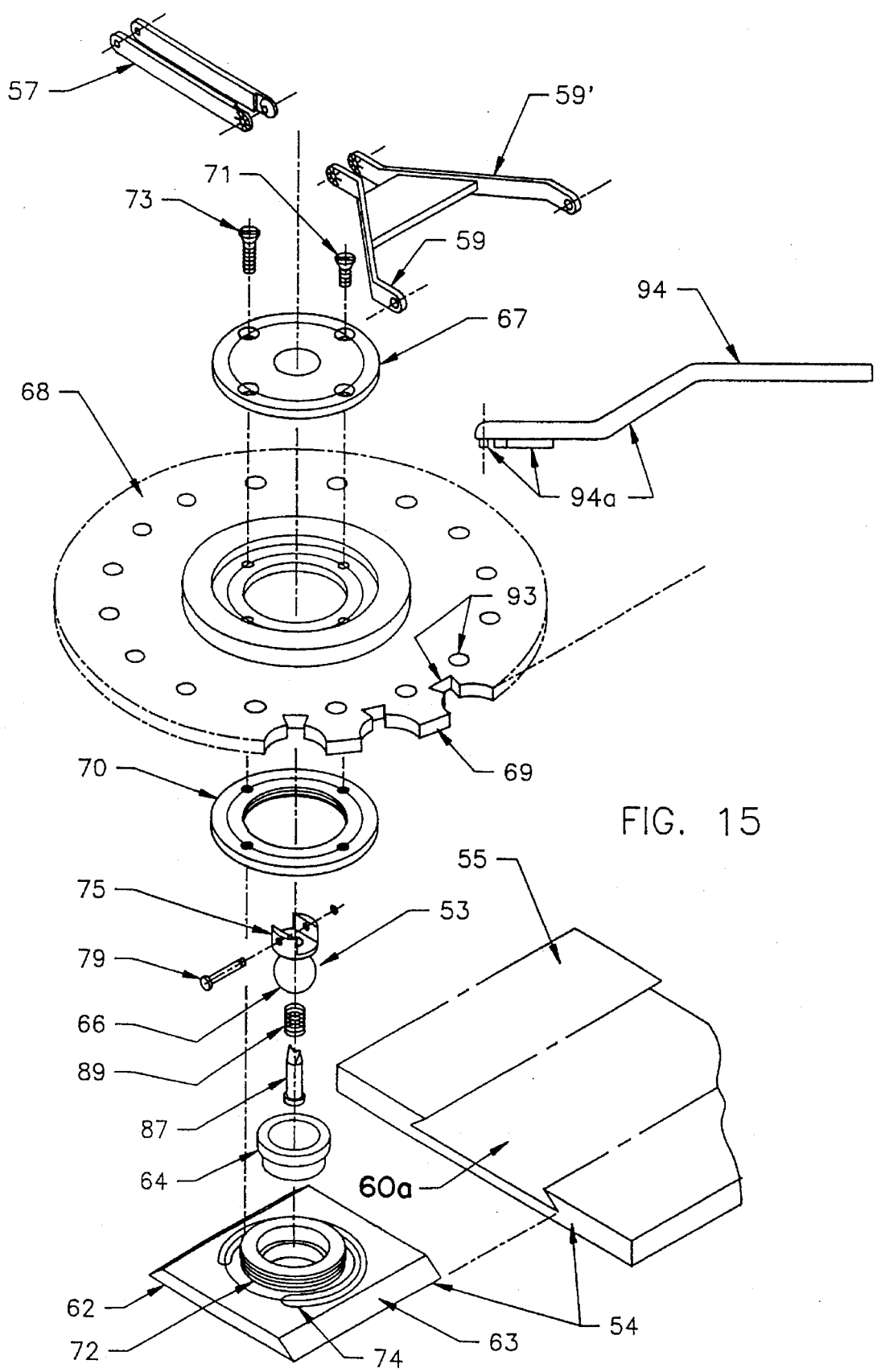

In the keyboard with the releasable universal coupling structure, the locking thereof should provide for a convenient operation. One preferred construction is illustrated in FIGS. 12–15, wherein a multi-section keyboard (FIG. 13) unit 50 for a computer or the like is located in a relatively flat storage position and alternately in a raised universally oriented position (FIGS. 14–15). The unit 50 has three sections 50a, 50b, and 50c and each includes a similar universal mount unit 51 and a single lock operator 52. Section 50a and 50b are data input sections while section 50c is a control section. The control section 50c is located to one side of the two data input keyboard sections 50a and 50b and is formed as a separate rectangular section. The mount unit for the one of the sections 50a is shown in detail in FIGS. 14–15a.

Generally, the unit 51 includes a single ball unit 53 secured by a slide unit 54 to the base unit 55 for the keyboard section. A three-point linkage unit 56 is coupled to the ball unit 53 and to the underside of the section 50a to permit raising and lowering thereof relative to the ball unit 53 and permitting the various orientations of the keyboard section.

The linkage unit 56 includes a first arm or link 57 which is pivotally secured to the ball unit 53 and to a fixed pivot support unit 58 on the keyboard section 50a. The two other links 59 and 59' are pivotally connected to the unit 53 and through similar slide supports 61 and 61' to the underside of the keyboard section. The mount unit 51 allows the placement of the section 50a essentially in a universal manner.

More particularly in the illustrated embodiment of the invention, the base unit 55 includes a flat plate 60 formed with an extended slide track 60a having tapered sidewalls which project laterally outwardly. A slide plate 62 having complementing edges 63 slides within the track 60a. The plate 62 has stepped opening 64 receiving a socket member 64, with an upwardly opening semi-circular recess 65. A pivot ball 66 rests in the recess and a pivot cover 67 overlies the upper end of ball 66 to form a socket within which the ball 66 pivots. Cover 67 is secured to the top of lock wheel 68 and is shown as a plastic plate-like member, the outer edge of which is notched as at 69 for conveniently manual rotation. A threaded latch ring 70 is secured in an inner recess of the wheel 68 by threaded screws 71, which simultaneously secures cover 67 to the wheel 68. The threaded latch ring 70 threads onto a vertically upstanding hub 72 projecting upwardly of slide plate 62. A limit screw 73 projects downwardly through the several elements of the wheel into a groove 74 within the slide plate 62. Groove 74 extends circumferentially about 270° and limits the rotation of wheel 68. Wheel rotation in one direction loosens cover 67, and in the opposite direction tightens the cover, relative to the ball for selectively releasing and locking the socket ball within the socket. The threaded ring 70 and the hub 72 provides for sufficient tolerance to accommodate normal wear characteristics and establishes a long life support for the three-point linkage.

An upstanding neck from ball 66 terminates in a generally U-shaped bracket 75 of a coupling, within which the linkage unit 56 is pivotally mounted to the ball. The first rigid arm 57 including a pair of similar rigid and spaced arm members 76 and 76' pivotally interconnected at one end to the support unit 58 by a pivot pin 77 projecting through a pair of depending bracket 78 to the underside of the mounting plate of section 50a. The opposite ends of arm members 76 and 76' are coupled to ball unit 53.

A latch pin 79 extends through the opposite arms of the U-shaped bracket 75 and is releasably secured in place by a nut.

The spaced members 76 and 76' are located on the central portion of the pin 79, with the links 59 and 59' pivotally secured on the pin 79 to the opposite side thereof.

Referring to the link 59, a relatively short end 80 pivots on pin 79 and an angled portion 81 projects outwardly and terminates in a short upper end 82 pivotally secured in the slide support 61. The arm members 76 and 76' extend inwardly between the bracket and the ends of the pivot links 59 and 59' and pivot on the pin 79.

The slide support unit 61 includes track 83 secured to the underside of the section 50a in laterally and longitudinally spaced relation to the pivot support unit 58. The inner side of track 83 has a longitudinal slot with a complementing slide bar 84 slidably mounted therein. A pivot pin 85 secures the link end 82 to the bar 84. Link 59 and 59' are thus similarly pivotally mounted to the underside of the section 50a and with the link 57 provide a 3-point support permitting the raising and lowering of the section 50a relative to the lock wheel 68 and the base unit 55.

The three-point collapsible suspension is readily constructed to permit orienting of the section between a vertical and horizontal orientation, as well as intermediate location and through the rotational and pivotal ball mount provides complete orientation on the three cartesian axis for effective universal orientation. The leg or link 57 is made shorter than the sliding links 59 and 59' to accommodate such vertical orientation, and in one embodiment leg 57 was two inches and links 59 and 59' were two and five eighth inches on center-to-center mount locations. Thus, the raised section can be pivoted on the pivot ball to any further desired orientation, and locked in place by rotation of the lock wheel, which simultaneously functions to lock the ball unit 53 and the linkage unit 56 to the slide plate 62 and the slide plate 62 to the base unit 55.

The locking mechanism consists of a spring-loaded lock pin 87 (FIGS. 14–15) vertically journaled within an opening 88, the ball 66 and ball neck and coupled to the linkage within the coupling unit.

The pin 87 extends upwardly through the neck into the linkage in the bracket 75. The ball end of opening 88 is enlarged to accommodate a coil spring 89 encircling the pin between a base in the pin opening and a pin head 90 having a spherical outer surface which is the same as that of ball 66. With the ball clamped within the socket recess, the spring 89 is compressed to continuously urge the lock pin 87 to move into the coupling. The outer lock end of the pin 87 (FIG. 15a) is generally tapered as at 91 and formed with a central recess 91a which mates with pin 87 as the pin projects upwardly between the innermost end of the links 76 and 76', which are preferably similarly tapered. Locking rotating of the wheel 68 moves the cover and ball downwardly, and simultaneously forces the lock pin 87 upwardly between the links 76 and 76'. The lock pin 87 moves the ends of the links within the bracket laterally and firmly clamps the linkage therein between the pin end and the bracket sides to rigidly hold the keyboard section 50a in the locked position.

To insure a firm rigid support, the faces of the link ends and the bracket arms may be formed with locking serration 92.

The linkage and pivotal ball system thus provides a simple, reliable and effective unit for universal mounting of a keyboard section with single actuated lock mechanism.

Wheel 68 may not have a sufficient diameter for low power and essentially hand operation, depending upon the particular overall keyboard construction. Wheels 68 are shown with recessed outer portions 92 which create an overlap of the wheels to permit the increased close abutment of the sections while maintaining a significant diameter and thereby leverage for securely locking the sections in place.

A force amplifying device may be incorporated into the system to apply the means for actuating of an appropriate release and locking unit, preferably with the simultaneous operator locking of all position units. For example, the wheels may include spaced openings and edge dovetail notches 93 within wheel to receive a wrench unit 94 having similar pins and dovetail end 94a for rotating of the wheel 68 with increased leverage for firmly actuating the locking mechanism.

The input data and related key sections 50a and 50b are formed into a first and second input section generally divided for accommodation of the left and right hands of the user.

As shown in FIG. 12, the key sections are preferably divided with the left section having offset recessed edge 95 reflects a removal of keys 96 for the right hand operation. The right hand section 50b in turn has an offset projecting edge 97 carrying the removed keys 96 and mates with the offset recessed edge 95 in the assembled position of FIG. 12. This maintains the proper finger orientation in each section.

With separated sections 50a and 50b, numeral 6 key 98a would be automatically separated and attached to the one section, shown as the right hand section 50b including the numeral 7. Depending upon the preference of the operator, the number 6 key is in fact actuated by either the left or right hand in a single piece keyboard. The number 6 key 98a is specially constructed for mounting to either of keyboard sections 50a or 50b. As shown in FIG. 16 for section 50a, the vertical separation wall at the separation line is formed as a recess 99 in the location of the number 6 key 98a. Key 98a is formed including a key unit 100 releasably located within a support housing 101, as by a press fit or other suitable means. The key unit 100 has a projecting electrical tab connector 102 which mates with recessed connector 103 to electrically connect the lay in circuits. A latch recess 104 is mounted to and extends downwardly below the location of the circuit keyboard connector 103. The underside of the separate key housing 101 is provided with a spade-type projection 105 having a spring arm 106 which is compressed within the recess to resiliently and releasably lock the key 98a to the separated section 50a.

The separated and mating wall of section 50b has a projection, not shown, which would normally mate with the recessed portion and is similarly constructed for electrical interconnection of number 6 key into section 50b. To place key 98a in section 50b, the key unit 100 is rotated within the housing 101 to maintain a proper visual view within section 50b.

With the separation of the keyboard sections 50a and 50b, the spacer bar unit 105 is separated into two bars 106 and 107, which are a preferred unique construction similarly formed as a telescopic bar. Referring particularly to FIGS. 17 and 18, spacer bar 107, shown having outer sliding cover 108, permitting extension of the corresponding bars 106 and 107 in a convenient location for operation by the thumb of the keyboard operator.

Cover 108 is shown as a U-shaped member. Opposed faces of the spacer bar and its cover are shown with an internal locking dedent to hold the cover in place. In FIG. 18, three recesses 109 are shown in the outer bar sidewall 109a. An internal cover projection 110 selectively engages anyone recess 109 to hold the cover in place. An outer cover enlargement 111 provides convenient positioning thereof. In practice, the enlargement 111 and projection 110 may be integrally formed and slidably mounted in the cover for enlargement of the dedent. The separatable spacer bar unit 105 may have any other extension construction including removable and releasably attached members within the broadest teaching herein. The separable and extendible slide bar structure provides a significant advantage to the practical implementation of the multiple section keyboard.

A further advantage of the universal mounting of the present invention with the ability to angularly orient the individual sections make it particularly applicable for application to certain handicapped individuals including those who may operate a keyboard with a pointer or like unit grasped by a different portions or appendages of the handicapped person. Thus, certain paraplegic individuals will often operate keyboards with a rod member grasped by the teeth or secured to the forehead or the like to permit the individual to depress a key by movement of his head. In such an application, it would be significantly advantageous if the keyboard unit could be provided with an inwardly canted V-shaped orientation of the keyboards such as wherein the outer edges of each section would be raised and the section would inclined inwardly and downwardly to provide the downwardly oriented or a concave V-shaped configuration. The keyboard can be oriented to permit a more direct in line engagement of the rod with a key, and with a more comfortable movement of the head. Although the keyboard sections will normally, in accordance with conventional practice, be formed as planar members, they can of course be provided with appropriate curvatures for certain particular applications and the like while retaining all of the other advantageous features and constructions disclosed by the present applicant.

Although shown with the several features of the new separable keyboard in a preferred construction, the several supports as well as the locking mechanism may be formed of other constructions. For example, a reversible ratchet drive mechanism secured to the cover unit with a single lever construction for releasing and locking of the apparatus in place may be desired. Other systems of amplifying a connection to the lock ball unit may of course be used to provide the necessary rotation of the illustrated locking mechanism coupled to the universal ball and linkage supports, as illustrated. Although individual locking for each of the several position supports may be provided, some systems for simultaneously providing locking and releasing of the three basic positioning supports, including horizontal adjustment, the vertical adjustment and universal rotational and tilting adjustment is preferably used within the teaching of the invention for optimal practical implementation of the multi-sectioned keyboard apparatus.

Similarly, for the pivotal mounting of the unit, any other type of a support structure which provides for the rotation generally in the plane of the keyboard and pivoting of the unit in space can be used. The basic concept is a provision of a keyboard section mounted in a raised position with essentially unrestricted angulated orientation of the plate with respect to the operator, from a horizontal position to any substantially orientations therefrom. The simultaneous lock mechanism can of course be provided with other mechanical mechanisms interposed between the several components and interconnected mechanically to provide the desired simplified but reliable interlocking of the system, either manually or through a single electrical and pneumatic control system. Similarly, the duplicate key structure can of course be provided as an integrated part of the one section with some form of a releasable interconnection to permit the movement of the key unit from the plane of the keyboard unit when it is provided in an aligned abutting relationship as for storage. Thus these and other variations of the illustrated embodiment of the invention will be readily provided by those skilled in the art based on the teaching of the present invention of the basic approaches for the several features.

Various modes of carrying out the invention are contemplated as being within the scope of the following claims particularly pointing out and distinctly claiming the subject matter which is regarded as the invention.

We claim:

1. A keyboard apparatus including a key support structure including a left hand and a right hand section, each of said sections including a plurality of individual keys located in a substantially common plane, the improvement in a separate support unit for each of said sections, each said support unit comprising a universal pivot unit permitting optimum positioning of said section, a linear support unit having a base and a linear moving member movably secured to said base for rectilinear positioning of said section on said base, said universal pivot unit including a rotational unit permitting unrestricted angular orientation of said section relative to said linear support unit, and a vertical support unit interconnected to said universal pivot unit and said linear support unit for raising and lowering of said section relative to said base, and a locking unit coupled to said linear support unit and to said universal pivot unit and to said vertical support unit to simultaneously lock said units in position, and wherein said vertical support unit includes a three-point linkage connected to said universal pivot unit, said linkage including a fixed pivoted leg and a pair of sliding pivotal legs, said fixed and sliding pivotal legs having a common pivot end and individual pivoted and spaced opposite ends.

2. The apparatus of claim 1, wherein a common pivot support secured to the universal pivot unit, said common pivot end is connected to said common pivot support, and said linear support unit includes a slide unit connected to said pivot unit for lateral spacing of said keyboard sections.

3. A keyboard apparatus including a key support structure with a plurality of keys secured to said support structure and arranged in an extended front-to-back and side-to-side extended array for supporting of said keys in said array, the improvement in the mounting of said key support structure, comprising a support unit connected to the key support structure and including a universal pivot unit for optimum positioning of said key support structure, said support unit includes horizontal support unit including a base support and a horizontal unit movably secured to said base support for rectilinear positioning of said key support structure on said base support, and said universal pivot unit including a rotational unit permitting unrestricted angular orientation relative to said horizontal unit, and a vertical support unit interconnected to said universal pivot unit and said horizontal unit for raising and lowering of said support structure relative to said base support, and a locking unit coupled to said horizontal support unit and to said universal pivot unit and to said vertical support unit to simultaneously lock all said units in position.

4. The apparatus of claim 3, wherein said base support is a plate member having an elongated slide track and said horizontal unit is a slide located within said track, said universal pivot unit including a first pivot member secured to the slide and a second pivot member secured to said vertical support unit.

5. The apparatus of claim 3 wherein said vertical support unit including a three-point linkage unit connected to said universal support unit and to said key support structure.

6. The apparatus of claim 5, wherein said horizontal unit is a slide unit and said pivot unit includes a ball and socket unit secured to said linkage unit and to said slide unit and having a threaded hub projecting upwardly, said locking unit including a cover including a threaded latch ring threaded onto said hub of said ball and socket unit, said cover having means coupled thereto for rotating of said cover on said hub for releasably locking the ball and socket unit and said slide unit and said linkage unit in place in response to the movement of the cover on said hub.

7. A keyboard apparatus including a key support structure with a plurality of keys secured to said support structure and arranged in an extended front-to-back and side-to-side extended array for supporting of said keys in said array, the improvement in a mounting of said key support structure, comprising a support unit connected to the key support structure and including a universal pivot unit permitting optimum positioning of said key support structure, said support unit including a base support and a horizontal unit movably secured to said base support for rectilinear positioning of said key support structure on said base support and said universal pivot unit including a rotation unit permitting unrestricted angular orientation relative to said base support, and a vertical support unit interconnected to said universal pivot unit and said horizontal unit for raising and lowering of said key support structure relative to said base support, and a locking unit coupled to said horizontal support unit and to said universal pivot unit and to said vertical support unit to simultaneously lock all said units in position.

8. An adjustable support apparatus, comprising:

a support unit, a pivot unit for inclined positioning of said support unit, an extendible support unit for positioning of said support unit in a first linear direction and including a three-point linkage having a common linkage connection, a slide unit for positioning said support unit in a second linear direction at an angle to said first linear direction, a connecting unit connecting said pivot unit between said slide unit and said common linkage connection;

a locking unit coupled to said connecting unit and operable to simultaneously lock said pivot unit, said extendible support unit and said slide unit, a common operator for actuating said locking unit between a lock position and a release position.

9. The support apparatus of claim 8, wherein said linkage including a fixed pivotal leg and a pair of sliding pivotal legs, said fixed and sliding pivotal legs have common joined ends as said linkage connection connected to said pivot unit and having spaced opposite ends.

10. The support apparatus of claim 9, wherein said locking unit includes:

said pivot unit includes a connected pivot ball and a socket and having one of said ball and sockets connected to said slide unit, a first member vertically journaled within said pivot ball and extended into engagement with said extendible support unit, said locking unit including a lever member coupled to said ball and socket and operable to move said ball and said socket relative to each other to lock the ball to the socket and to simultaneously force said first member into locking engagement with said extendible support unit and simultaneously move said slide unit to clamp said slide unit in place.

11. The support apparatus of claim 10, wherein said locking unit includes:

a clamp plate member overlying said ball and socket opposite said slide, said locking lever member being adjustably secured to said slide unit for rotational positioning about said ball and socket unit and coupled to said clamp plate member to move said clamp plate member relative to said slide and thereby simultaneously move said clamp plate member and said slide unit toward each other and thereby lock the slide unit in place and clamping said ball in place in said socket unit and moving said first member into locking engagement with said extendible support unit.

12. The support apparatus of claim 11, wherein said slide unit includes:

a base track and slide member mounted for movement in said track, said lever is a round plate member concentrically mounted about the ball and socket and having a threaded connection to said ball and socket, said clamp plate member being secured to said round plate member for linear movement therewith, said clamp plate member being secured to said slide member for selectively clamping said slide member in place and simultaneously clamping said ball and socket in place and said linkage in place.

13. A support apparatus for positioning a member in space, comprising:

a base support unit, a linear unit for rectilinear positioning of said member and including a first locking unit;

a universal support unit including a rotational unit permitting unrestricted angular orientation of said member relative to said linear unit and including a second locking unit;

a vertical support unit for raising and lowering of said member and including a third locking unit;

a connector unit interconnecting said universal support unit and said vertical support unit and said linear unit for positioning said member relative to said base support unit; and a lock actuating mechanism coupled to said first, second and third locking units and having a single operating member movable between a lock position to simultaneously lock said locking units in place and a release position to simultaneously release said locking units.

14. The apparatus of claims 13, wherein said linear unit includes:

a base plate having an elongated slide track and a slide located within said track, said universal support unit being a ball and socket unit including a pivot socket secured to said slide and a ball secured to said vertical support unit, and said vertical support unit includes a three-point linkage unit having three legs with a common connector connected to said ball and said three legs each having an outer end adapted to be connected to said member for vertical positioning of said member relative to said ball and socket unit and said slide.

15. The apparatus of claim 14, wherein said socket unit includes a threaded hub projecting upwardly, a lock member movably secured to said ball and aligned with said common connector, said locking unit includes a threaded latch cover unit threaded onto said threaded hub, said cover unit having a cover overlying said ball and operable to force said ball into said socket and simultaneously operable to clamp said slide in said track and force said lock member into said common connector, and said operating member is a lever member coupled to said cover unit for rotating of said cover unit and thereby move said locking units between said lock position and said release position.

* * * * *

UNITED STATES PATENT AND TRADEMARK OFFICE
CERTIFICATE OF CORRECTION

PATENT NO. : 5,466,078

DATED : NOVEMBER 14, 1995

INVENTOR(S) : JEFFREY P. SZMANDA ET AL

It is certified that error appears in the above-identified patent and that said Letters Patent is hereby corrected as shown below:

COL. 12, line 53, Claim 11, after "move" delete "-" (hyphen);

Signed and Sealed this

Eighteenth Day of February, 1997

Attest:

BRUCE LEHMAN

Attesting Officer

Commissioner of Patents and Trademarks